United States Patent [19]

Bollhalder et al.

[11] 4,144,149

[45] Mar. 13, 1979

[54] METHOD FOR WORKING UP AQUEOUS RESIDUES FROM METALLIZING BATHS

[75] Inventors: Heinz Bollhalder, Neuenhof; Vladimir Sova, Mellingen, both of Switzerland

[73] Assignee: BBC Brown, Boveri & Company, Limited, Baden, Switzerland

[21] Appl. No.: 891,223

[22] Filed: Mar. 29, 1978

[30] Foreign Application Priority Data

Apr. 6, 1977 [CH] Switzerland .................. 4344/77

[51] Int. Cl.$^2$ ........................ C25C 1/12; C02C 5/12
[52] U.S. Cl. .............................. 204/149; 204/10; 204/52 R; 204/152
[58] Field of Search ............ 204/10, 52 R, 149, 152, 204/106, 202, 260

[56] References Cited

U.S. PATENT DOCUMENTS

| | | | |
|---|---|---|---|
| 3,748,240 | 7/1973 | Johnson et al. | 204/149 |
| 3,784,455 | 1/1974 | Parikh et al. | 204/202 X |
| 3,827,964 | 8/1974 | Okubo et al. | 204/260 X |
| 3,899,405 | 8/1975 | Iverson et al. | 204/149 |
| 3,970,531 | 7/1976 | Recht | 204/149 |
| 4,052,276 | 10/1977 | Yoshida et al. | 204/149 X |
| 4,072,596 | 2/1978 | Moeglich | 204/1 R |

*Primary Examiner*—Arthur C. Prescott
*Attorney, Agent, or Firm*—Oblon, Fisher, Spivak, McClelland & Maier

[57] ABSTRACT

A method for purifying aqueous residues from exhausted metallizing baths, which contain at least one amino compound as a complex-forming agent, which comprises anodically treating the aqueous residue containing heavy metal ions and complex-forming agent at a voltage, current density and time sufficient to eliminate the complexing ability of the amino compound, and removing the heavy metal ions from said aqueous residue.

15 Claims, No Drawings

METHOD FOR WORKING UP AQUEOUS RESIDUES FROM METALLIZING BATHS

BACKGROUND OF THE INVENTION

1. Field of the Invention

The invention relates to a method for purifying aqueous residues from exhausted metallizing baths, such as baths customarily used in the production of printed circuits for forming predetermined circuitry of copper or other metallic conductors on appropriate substrates, and to the use of this method for working up exhausted baths for the production of printed circuits by currentless deposition of copper.

2. Description of the Prior Art

Modern industrial metallizing baths, such as are widely used for depositing copper and other heavy metals by electrolytic methods or methods which operate without external current, especially for the production of electrical or electronic components, for example printed circuits, even in the exhausted state contain substantial amounts of components which have not been consumed. Ecological and economic reasons require that such baths be worked up in such a way that harmful emissions are prevented, using the least possible amount of energy and at the lowest possible cost.

This problem is particularly serious because, when the exhausted baths are worked up, the amino compounds contained in such baths as the complex-forming agent, precisely because of their pronounced action in preventing the precipitation of cationic constituents, oppose the main object of working up, that is to say the recovery of an effluent which is virtually free from heavy metal ions.

Such complex-forming agents containing amino groups, such as the water-soluble salts of ethylenediaminetetraacetic acid (EDTA), are in themselves virtually acceptable from the physiological point of view and are used in many industries and even for therapeutic purposes (accelerated excretion of heavy metals from the body). Many of these complex-forming agents and specifically EDTA are, however, chemically so stable that they do not decompose with the customary methods and can be destroyed only by very strong oxidizing agents or by thermal decomposition. However, this is again ecologically and/or economically disadvantageous.

On the other hand, the industrial working up of solutions or effluent concentrates of various origins which contain heavy metal ions is usually based on the precipitation of hydroxides from the mixed solutions and a treatment of this type is, of course, not possible when one of the concentrates still contains complex-forming agents of said type, especially EDTA.

Conventional processing is, thus, virtually not economically practical and the solubility of heavy metal ions bonded as a complex with such complex-forming agents or chelating agents cannot be reduced by the conventional methods of working up such baths. It was necessary to reduce the proportion of complex-forming agents in the aqueous phase virtually to zero when working up exhausted metallizing baths, in order to keep within the permissible limiting concentrations for heavy metal ions in the effluent, and this cannot be achieved in an economic manner according to the state of the art with ecologically admissible agents. There are also limits on the method which has usually been necessary hitherto, and which is ecologically unsatisfactory, which comprises extensive dilution of the effluent from such a work-up in order to keep within the permissible concentrations for heavy metals.

A need continues to exist for a technique of treating exhausted metallizing baths to produce an ecologically acceptable effluent economically.

SUMMARY OF THE INVENTION

An object of this invention is to provide a technique for purifying aqueous residues from exhausted metallizing baths, especially coppering baths which operate without external current, which contain at least one amino compound as a complex-forming agent or chelating agent.

Another object of the invention is to provide a method which produces an effluent virtually free from heavy metal ions such that it can be fed without dilution into the communal sewerage system or a drain.

Still another object of this invention is to provide a method which produces an effluent containing less than 1 mg of heavy metals ions per liter of effluent.

These and other objects of this invention have been achieved by the method wherein aqueous residue containing heavy metal ions and an amino-contaning compound as a complex-forming agent, as the free acid or as a salt, is subjected to an anodic treatment in order to eliminate the complexing ability of the amino compound.

DESCRIPTION OF THE PREFERRED EMBODIMENTS

The anodic treatment is preferably carried out as an electrolysis of the aqueous residue, and deposition of the heavy metal on the cathode can take place simultaneous with anodic treatment.

It is surprising that effective removal of the highly complex heavy metal ions from the aqueous bath residues is possible by means of this anodic treatment, which is relatively simple to carry out. Especially since the aqueous residue contains complex-forming agents virtually in the concentrations which are typical for conventional metallizing baths. The concentration of complex-forming agent is not critical, but is conventionally present in exhausted metallizing baths at concentrations of about 30-40 g/l.

The anodic treatment may be carried out at alkaline, acid or neutral pH's. It is preferred to begin the treatment with an alkaline bath, preferably at a pH of 10-12, which can be regulated if necessary by adding alkali, such as NaOH or other inorganic bases. The pH value is then shifted, stepwise or continuously, through the neutral and into the acid range, preferably down to pH values of 0.5 to 3.5, by adding acid, preferably a strong mineral acid, such as HCl. Either A.C. or D.C. current may be used and the voltage is not critical. In order to enable cathodic deposition of copper to take place in the course of the anodic treatment, the treatment is preferably carried out with direct voltage.

The cathode can be an electrode of sheet steel, while the anode preferably consists of a metal which is inert under the process conditions or is coated with such a metal.

The anodic treatment can be carried out at room temperature (15°–25° C.). Autogenous warming as a result of the electrolysis is, however, not disadvantageous. If desired, the electrolysis bath can be heated or cooled.

The anodic treatment time which elapses before the complexing ability is eliminated depends on variable parameters, such as concentration, current passage, current density and temperature. In practical operation, periods ranging from hours to days are typical.

This invention can be used to treat any aqueous solution containing heavy metal ions and an amino group containing complexing agent. Typical complexing agents include alkaline diamines, preferably water soluble salts of alkylenediaminetetracarboxylic acids such as ethylenediaminetetraacetic acid (EDTA).

The chemical mechanism of the anodic treatment or oxidation which according to the invention results in the elimination of the complexing ability of the amino compound present in the aqueous residue, and the oxidation level of the resulting products have not been fully clarified. The findings that the complexing ability of amino compounds, such as EDTA, can be completely and irreversibly eliminated, even in the presence of heavy metal ions complexed with the amino compound, by an anodic treatment which can be carried out in an aqueous medium and, accordingly, that a problem-free elimination, which can, if desired, take place in parallel, of the heavy metal ions present, for example by electrical reduction and deposition, can be achieved are established.

If desired, the aqueous bath or solution may be simply subjected to anodic treatment to destroy the complexing ability of the complexing agent without simultaneous deposition of the heavy metal ions. The heavy metal ions may be retained in solution and subsequently recovered by conventional chemical precipitation techniques, if desired.

In the case of aqueous baths or bath residues which contain EDTA in concentrations of 1–30 g/liter, complete elimination of the complexing action, which presumably is based on the oxidative conversion of the amino groups of the complex-forming agent into $NO_x$ ($x = 1$ or 2), can be achieved, for example, under the above-mentioned electrolysis conditions with anodic current densities in the range of 7–30 A/dm$^2$.

The cathodic current density for the preferred simultaneous electrolytic deposition of the residual heavy metal can be kept the same as or smaller than the anodic current density.

It is preferred that the current density at the anode is at least 7 A/dm$^2$ and the current density at the cathode is at least 2 A/dm$^2$. Lower current densities require long treatment times and, hence, are not preferred.

Further components such as wetting agents usually contained in the metallizing or coppering baths of conventional composition, such as are used for the currentless deposition of metal, usually do not necessitate any special measures. The conventional inorganic complex-forming agents (cyanides) which may be present can be eliminated or rendered harmless by conventional techniques.

Pretreatment of the aqueous residue in order to remove heavy metal and/or complex-forming agent by chemical precipitation is in itself not necessary but can be advantageous in order to recover these components. A virtually complete removal of the heavy metal without the anodic treatment according to the invention in order to eliminate the complexing ability of the amino compound, that is to say solely by chemical precipitation, is not economically possible.

The pretreatment, which is to be carried out if desired, of the aqueous bath or residue by chemical precipitation can appropriately take place in two steps. A first precipitation treatment separates off a predominant proportion of the heavy metal, preferably at least 90% by weight and in particular about 95% by weight or more, of the heavy metal or copper contained in the exhausted aqueous metallizing bath or coppering bath. A second precipitation treatment separates off a predominant proportion of the complex-forming agent, preferably at least 90% by weight and in particular about 97% by weight or more, of the amino compound or EDTA compound present as the complex-forming agent in the exhausted bath.

The first precipitation is preferably effected by forced precipitation of the dissolved heavy metal or copper, say by warming the bath, which has been rendered alkaline (pH $\geq$ 12) for example with an alkali metal hydroxide, to 70°–100° C. in the presence of metallic material of the same type with a high specific surface area (for example in powder form), optionally with the addition of a volatile reducing agent or a reducing agent which forms volatile or non-toxic oxidation products, such as formaldehyde (aqueous solution). The optimum time for this treatment depends on the various parameters mentioned and on the composition of the bath, but can simply be determined empirically and is usually concluded within 60 minutes.

The metallic or precipitated material present at the end of the first precipitation is preferably separated off as rapidly as possible, say by filtration, decanting or centrifuging, in order to prevent it from redissolving.

The aqueous phase can then be subjected to the second precipitation in order to precipitate the free complex-forming agent in the lowest solubility range, in the case of EDTA preferably by acidifying to pH values of less than 2, for example by adding technical-grade acid, especially a mineral acid.

The method according to the invention can be carried out batch-wise or continuously using equipment or installations which are in themselves known.

The resulting depleted solution is then treated by the technique of this invention to remove the remainder of the dissolved heavy metal ions.

Having generally described the invention, a more complete understanding can be obtained by reference to certain specific examples, which are included for purposes of illustration only and are not intended to be limiting unless otherwise specified.

EXAMPLE 1

An exhausted metallizing bath, such as is obtained from the production of printed circuits by coppering, without external current, of conventional carrier plates, has the following composition (in g/liter):

| | |
|---|---|
| EDTA (tetrasodium salt) | 37.8 |
| $CuSO_4 \cdot 5H_2O$ | 9 |
| NaCN | 0.036 |
| NaOH | 1.13 |
| Surface-active agent (for example "Cafac RE-610") | 0.24 |
| Formaldehyde (in the form of a 37% strength aqueous solution) | 4 |
| Water | Remainder |

A 700 liters plastic-lined vat which is provided with steel sheets, contained in plastic sacks, as the cathode and with platinum-coated titanium sheets as the anode is charged with the exhausted metallizing bath liquid.

If the pH value is not already 10–11, solid sodium hydroxide is added until a pH value in this range is obtained.

A current passage of 200–300 A, corresponding to an anodic current density of 7–20 A/dm$^2$ and a cathodic current density of between 2 and 7 A/dm$^2$, is set up between the anode and the cathode, the electrodes being 17 cm apart, at a direct voltage of 8.5 volts. The electrolysis is then allowed to proceed for about 24 hours. The pH value is now adjusted to 7.5 to 6 by adding concentrated hydrochloric acid and about 25 liters of concentrated acid are required for this.

The addition of acid results in foaming of the bath liquid and the acid is therefore appropriately added in 500–1,000 ml portions.

The electrolysis current can be switched off during the addition of the acid, but this is not necessary.

Electrolysis is now continued for a further 24 hours and the pH value is then adjusted to 3.0 to 0.5 by adding concentrated hydrochloric acid and, again, about 25 liters of acid are required for this and are added in portions. After a total of 72 hours, the electrolysis is concluded, as shown by the operating test described below.

During the electrolysis, the current passage rises up to 500 A and the bath liquid warms from room temperature (15°–25° C.) to 65°–75° C. The gases evolved during the electrolysis and on the addition of acid are sucked off and treated in a conventional manner, in order to remove toxic constituents (nitrogen oxides and HCN).

As a result of the anodic treatment, the complexing ability of the EDTA is virtually completely eliminated and this is probably due to an oxidative degradation of the amino group (evolution of nitrogen oxides) and manifests itself, inter alia, in that the copper ions are virtually completely reduced to metallic copper at the cathode and can be precipitated in this form from the aqueous bath residue.

The copper ion content of the treated liquid can be monitored in a simple manner as follows: the pH of a sample of about 50 ml is adjusted to < 1.8 with HCl and the sample is brought into contact with a piece of steel wire which has been pickled by treatment with concentrated HCl. After 30 minutes, the steel wire is removed and examined under a microscope to determine whether there is a Cu precipitate. For the purposes of the method according to the invention (copper ion content < 1 mg/liter), the electrolysis is concluded when no deposition of Cu on the steel wire can be discerned in this test.

Quantitative analysis gave a Cu ion content for the bath residue treated according to the invention of 0.4 to 0.9 mg/liter.

EXAMPLE 2

An exhausted coppering bath of the composition indicated in Example 1 is subjected, prior to the anodic treatment, to a two-stage chemical precipitation treatment in order to separate off and recover copper and EDTA, as follows:

(A) First Precipitation (Copper)

10 g of fine copper grit are added per liter of the exhausted bath liquid. 10 g of solid NaOH are then added per liter of liquid, while stirring, the resulting mixture is warmed to 80° C., while continuing to stir vigorously, and 15 ml of aqueous formaldehyde solution (37% strength) are added.

Since extensive foaming can occur during the reduction, the dimensions of the treatment vessel must be about three to four times as great as the volume of the bath.

As soon as the reduction of the first precipitation has ended, as shown by the disappearance of the blue color of the supernatant solution, the aqueous residue is separated from the sediment. The copper recovered is supplied for re-use.

(B) Second Precipitation (EDTA)

Sulphuric acid is added to the aqueous residue obtained in (A), while stirring vigorously, until the pH value is 1.8. Usually about 30 g of concentrated $H_2SO_4$ per liter of starting bath are required for this. A precipitate forms which essentially consists of EDTA and, after settling, this is separated off from the aqueous residue.

The EDTA recovered is supplied for re-use (washing and reaction with NaOH). Based on the starting bath, up to about 97% by weight of EDTA can be recovered in step (B).

(C) Anodic Treatment

The aqueous residue obtained in step (B) contains, per liter, about 1 g of EDTA and 10 mg of Cu which cannot be separated off by chemical precipitation; NaOH is added, at room temperature, to this residue until the pH value stabilizes at 11.5. The aqueous residue is then subjected to electrolysis in an electrolysis vessel, which contains a platinum-coated titanium anode and a cathode of stainless steel (S 18/8), with direct current at an anodic current density of 32 A/dm$^2$ and a cathodic current density of 16–32 A/dm$^2$. At an initial pH of 11–12, about 1 g of EDTA is decomposed per ampere-hour. Electrolysis is continued until no further EDTA can be determined by titration in the aqueous residue.

After the electrolysis has ended, the residual amount of Cu has been virtually completely precipitated at the cathode.

The method of the invention is suitable not only for working up metallizing baths of the said type but also for purifying industrial effluents of other origin which contain amino compounds as complex-forming agents and, thus, complexed heavy metal ions.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A method for purifying aqueous residues from exhausted metallizing baths, which contain at least one amino compound as a complex-forming agent, which comprises anodically treating the aqueous residue containing heavy metal ions and complex-forming agent at a voltage, current density and time sufficient to eliminate the complexing ability of the amino compound, and removing the heavy metal ions from said aqueous residue.

2. The method of claim 1, wherein said heavy metal ions are copper ions, and said amino compound is an alkalenediaminetetracarboxylic acid or salt thereof, wherein copper is deposited at the cathode during the anodic treatment.

3. The method of claim 2, wherein the pH of the aqueous residue subjected to electrolysis is alkaline at the start of the electrolysis and is then shifted to an acid pH by adding acid.

4. The method of claim 1, wherein, prior to the anodic treatment, the aqueous residue is freed from the predominant proportions of heavy metal ions and complex-forming agent by chemical precipitation.

5. The method of claim 4, wherein the aqueous residue is subjected to a first precipitation treatment, in which a predominant proportion of the heavy metal is removed, and to a second precipitation treatment, in which a predominant proportion of the amino compound serving as the complex-forming agent is removed.

6. The method of claim 5, wherein the heavy metal ions in the aqueous residue are predominantly copper ions, and the first precipitation comprises a forced chemical precipitation, by reductive treatment of the bath with particulate metallic copper at an alkaline pH and the precipitated copper is removed immediately after the end of said first precipitation.

7. The method of claim 5, wherein the complex-forming agent is ethylenediamine compound, in the form of the free acid or in the form of a salt, and said second precipitation comprises changing the pH value of the aqueous residue to the acid range to precipitate the predominant proportion of the ethylenediamine compound in solution, and the ethylenediamine compound precipitated is removed.

8. The method of claim 1, wherein the anodic treatment is an electrolysis at pH values of between 2 and 12 to convert the amino groups of the complex-forming agent to $NO_x$ groups, in which x is a number from 1–2.

9. The method of claim 6, wherein at least 90% by weight of the amount of copper contained in the exhausted aqueous metallizing bath is removed in the first precipitation treatment.

10. The method of claim 7, wherein at least 90% by weight of the ethylenediamine compound present as the complex-forming agent in the exhausted aqueous bath is removed in the second precipitation treatment.

11. The method of claim 8, wherein the heavy metal ions still present in the aqueous residue after the precipitations are cathodically reduced and deposited during the electrolysis.

12. The method of claim 1, wherein the anodic treatment is an electrolysis at an anodic current density of at least 7 $A/dm^2$ and a cathodic current density of at least 2 $A/dm^2$.

13. The method of claim 1, wherein said aqueous residues comprise an exhausted copper depositing bath for the preparation of printed circuits.

14. The method of claim 6, wherein said alkaline pH is a pH greater than 12.

15. The method of claim 7, wherein said ethylenediamine compound is ethylenediaminetetraacetic acid or salt thereof and said acid pH is less than 2.

* * * * *